…

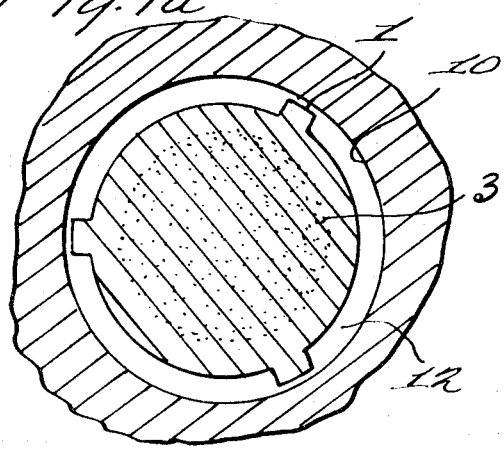
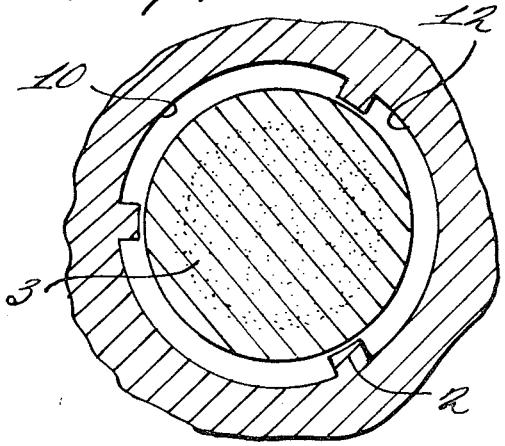
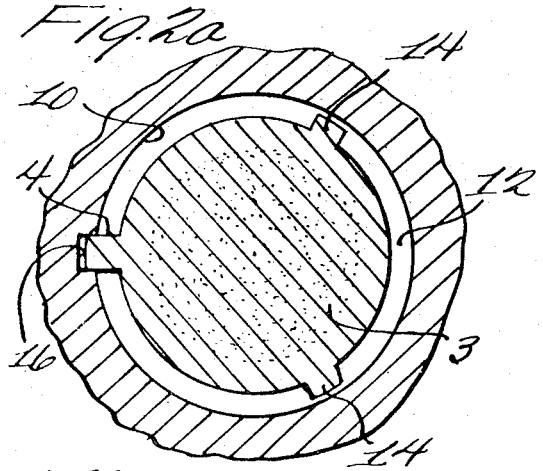
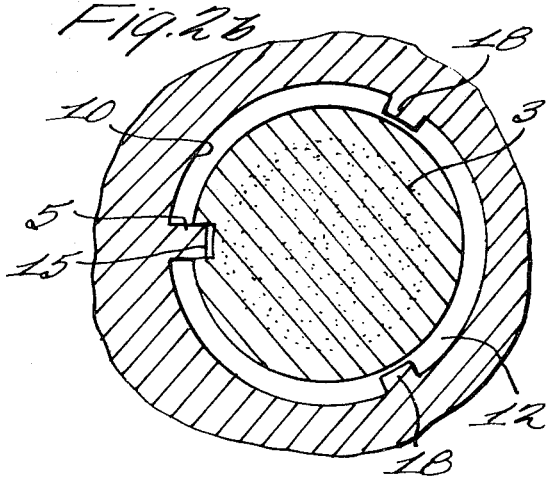
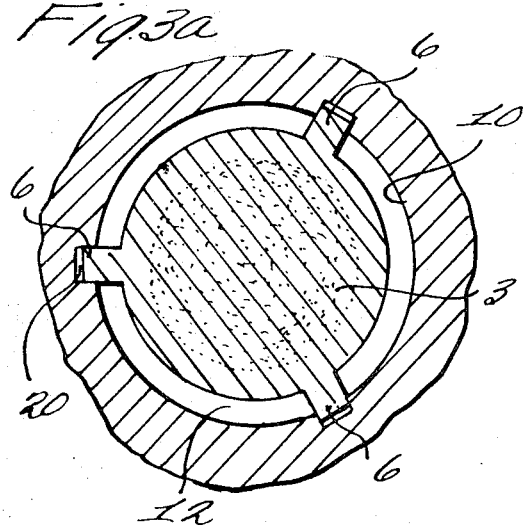
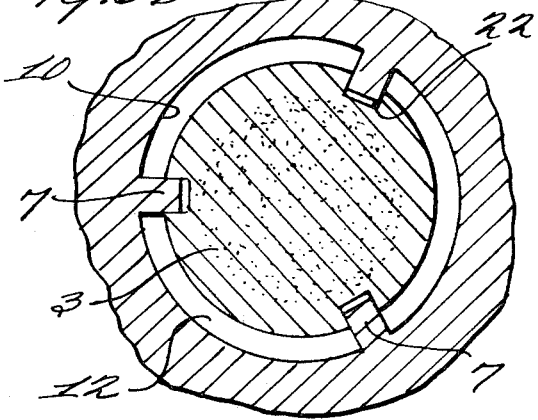

United States Patent Office 3,738,912
Patented June 12, 1973

3,738,912
FUEL ELEMENT FOR HIGH TEMPERATURE REACTOR
Lothar Rachor, Kleinauheim, and Karl-Gerhard Hackstein, Hanau am Main, Germany, assignors to Nukem Nuklear-Chemie und-Metallurgie, GmbH, Wolfgang, near Hanau am Main, Germany
Filed Sept. 10, 1969, Ser. No. 856,542
Int. Cl. G21c 3/18
U.S. Cl. 176—71                                 12 Claims

ABSTRACT OF THE DISCLOSURE

There is provided a fuel element for high temperature reactors comprising a fuel body and a structural graphite body surrounding the fuel body and spaced therefrom. Flange means on either the fuel body or the graphite body is provided extending part way through the space to provide for possible relative changes in dimensions of the fuel body and the graphite body.

---

Fuel elements (rod or block form) for high temperature reactors may consist of graphite as the structural material with a fuel filling. The fuel, in the form of coated particles, is contained in a graphic body matrix which is inserted in the structural material.

There have been proposed elements with outer, or outer and inner, cooling by which the fuel containing graphite body matrixes are prepared as hollow or solid cylinders or cylindrical rods and then are inserted in graphite tubes or in bore holes of graphite blocks of various geometry, i.e. tetragonal, pentagonal or hexagonal shape.

In a further process the fuel is poured into prefinished fuel containers of graphite jointly with a binder containing graphite matrix. Through coking of the binder the matrix is consolidated whereby a more or less strong bonding of the individual particles with each other as well as with the container is attained, whereby the bonded body itself has a relatively small thermal conductivity.

All of these concepts have the following principal disadvantages:

(1) The structural material almost always consists of well graphitized electrographite, while the carbon matrix of the fuel containing body because of the process of production always contains considerable amounts of non-graphite carbon, because the fuel containing body can not be brought to graphitizing temperature since this would destroy the fuel particles. This leads to different physical, especially nuclear physical, properties between structural graphite and fuel bodies.

(2) It is known that carbon undergoes a negative and then a positive dimension change, which is very different for individual carbon structure according to temperature and fast neutron dose. Therefore the splits between structural material and fuel body which occurs during manufacture can enlarge during the operation of a reactor, and this leads to poor heat transfer and undesired high fuel temperatures. On the other hand the splits can contract so far, however, under certain circumstances, that the structural material is ruptured. A balancing between structural material and fuel body is not possible since very different temperature and flow conditions prevail inside the reactor.

These disadvantages can be completely done away with by the present invention. Dimension changes of the structural graphite and the fuel body are possible and permissible with elements of the present invention without thereby changing the thermal conditions and impairing the mechanical strength in any manner.

The subject of the invention is a fuel element for high temperature reactors whose especial characteristics are that preferably cylindrical fuel bodies consisting of a homogeneous mixture of carbon matrix and coated fuel particles and a transitionless surrounding on all sides particle free shell of the same carbon matrix are inserted in a graphite tube or bore hole of a graphite block with the use of suitable spacers.

By this means thermal or radiation induced dimension changes of the components are compensated for without increasing temperature of the fuel and without mechanical strain in the fuel element resulting.

The production of the fuel element can take place in the manner that isotropic fuel bodies from a mixture of natural graphite and/or electrographite and binder as well as coated fuel particles together with a fuel free shell of the same matrix composition are compressed isostatically or quasi isostatically.

The fuel bodies can be provided with maintenance of the fuel free shell surrounding on all sides with a central cavity. Thereby an additional direct inner cooling of the fuel body is possible.

The fuel body can be fixed in the fuel element by clearance supports, e.g. spacers which either in the form or flanges or crosspieces are already attached to the fuel body itself by the pressing process or are attached to the graphite tube or the bore hole of the structural material or which are separate construction parts, whereby so much clearance is provided for between the flanges and counterparts that possible changes in dimension changes are provided for.

It is suitable that the fuel body or graphite tube or bore hole of the structural graphite has at least three flanges of which one is interlocked in a corresponding slot of the counterpart in order to prevent a twisting of the fuel body.

The clearance support can also be attached as a separate construction part to cylindrical extensions of the fuel body or the jacket surface and brace itself on the inner wall of the graphite tube or the bore hole of the structural graphite with corresponding clearance.

The fuel body with a central bore hole can be fixed to this by a graphite pin with interposed star shaped clearance supports.

In the drawings are described illustrative examples of fuel elements according to the invention.

FIGS. 1a and 1b are sectional views of one set of complementary forms of the invention;

FIGS. 2a and 2b are sectional views of another set of complementary forms of the invention;

FIGS. 3a and 3b are sectional views of a third set of complementary forms of the invention;

FIG. 4b is a perspective view of the clearance support of FIG. 4a;

FIG. 4c is a sectional view along the line 4c—4c of FIG. 4a; and

Figure 4A:
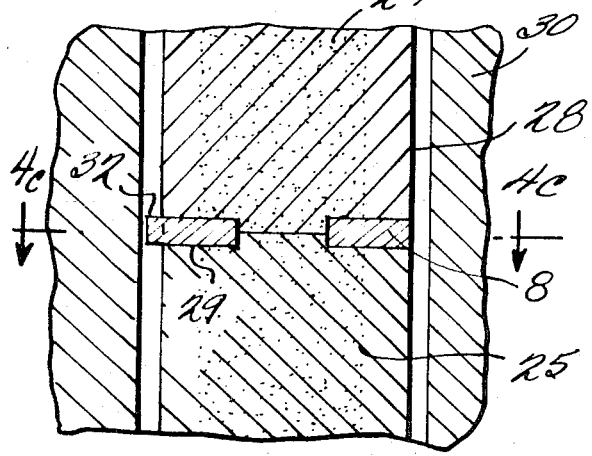
FIG. 4a is a vertical sectional view of another form of the invention.

Referring more specifically to the drawings wherein like parts have like numbers in the illustration according to FIGS. 1a and 1b the clearance supports are in the form of flanges 1 on the fuel insert 3 or flanges 2 on the inner wall 10 of the graphite tube or bore hole 12 between the fuel insert and graphite tube whereby sufficient clearance is provided that the greatest possible changes in dimension can be intercepted. In this form of the invention turning of the fuel inserts is possible.

In the form of the invention in FIGS. 2a and 2b turning of the fuel insert is prevented by a flange 4 on the fuel insert in FIG. 2a or a flange 5 on the graphite tube in FIG. 2b. It will be observed that the flange 4 or 5 extends completely through and beyond the bore hole 12 between the insert 3 and the graphite tube to prevent such turning. A small recess 16 in the graphite tube or small recess 15 in the insert is provided to allow for changes of dimension on the flange in relation to the graphite tube or insert respectively. The remaining flanges such as 14 and 18 only extend partially through the bore hole.

As shown in FIGS. 3a and 3b the fuel can be held exactly in its position by three ribs 6 or 7 which interlock in deep slots 20 and 22 of the counterpart whereby changes in dimension can have no influence. It will be observed that here also the slots are deeper than the flanges.

Figure 4B:
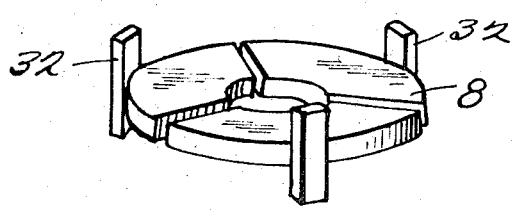
Figure 4C:
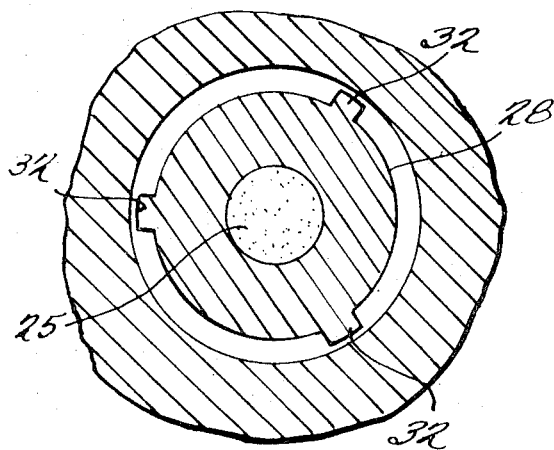

The advantages of the present invention of a fuel element with direct cooling of the fuel body will rise to full value if the clearance supports are made as a separate construction part 8 as is shown in FIGS. 4a, 4b and 4c. Thus the support 8 is provided horizontally as an inset in a groove 29 cut in fuel body inserts 24 and 25 at their juncture and situated in the bore hole 28 of graphite tube 30. The support 8 is provided with flanges 32 similar to the flanges described in connection with FIGS. 1a and 1b. The support 8 can be made in a plurality of sections as shown in FIG. 4b.

Figure 5:
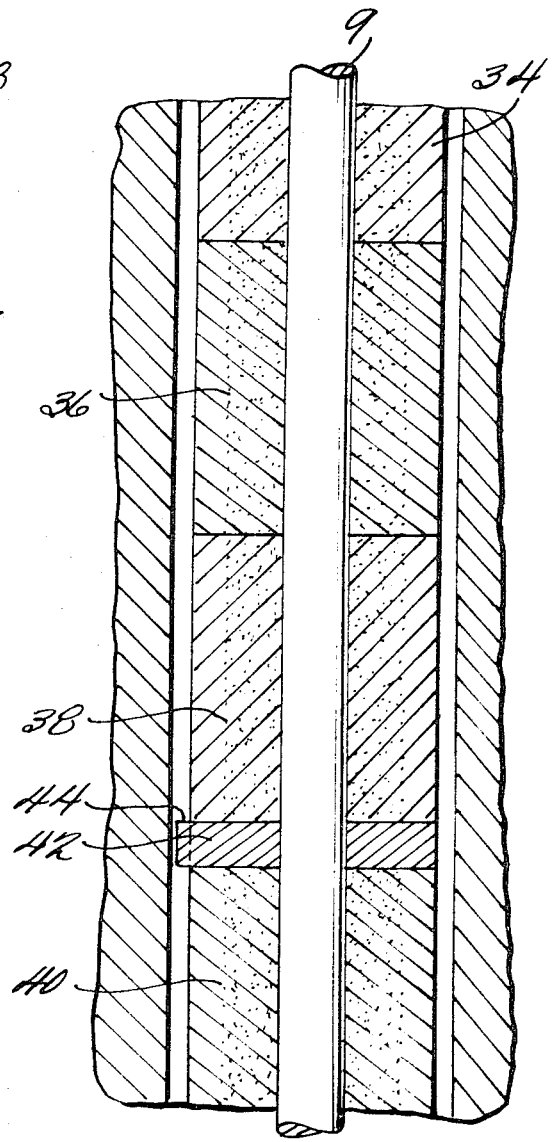
FIG. 5 is a vertical sectional view of an embodiment of the invention.

When fuel bodies having a central opening are used this opening can also serve for fixing of the formal column from the individual fuel bodies 34, 36, 38 and 40 by a central pin 9 in combination with a star formed clearance support 42 having a plurality of flanges 44 as shown in FIG. 5.

The fuel bodies preferably have a cylindrical geometry. However, the advantage of the invention is present if other cross sections are used, for example tetragonal or hexagonal with sharp or rounded off borders.

When the fuel body is provided with a central hole it can be cooled directly by a gas stream.

What is claimed is:
1. A fuel arrangement for high temperature reactors with direct cooling of the fuel body comprising a fuel body consisting of a carbon matrix having embedded therein homogeneously distributed coated fuel particles and a particle-free shell of the same carbon matrix surrounding the matrix on all sides, said fuel body being positioned generally coaxially in an open-ended coolant passage in a structural graphite body and separated therefrom by a space, and spacer means extending almost completely across said space between said fuel body and said graphite body.

2. A fuel element according to claim 1 wherein said spacer means includes a plurality of spacers which are parts of said fuel body.

3. A fuel element according to claim 1 wherein said spacer means includes a plurality of spacers which are parts of said graphite body.

4. A fuel element according to claim 1 wherein the fuel body is cylindrical.

5. A fuel element according to claim 1 wherein sufficient play is provided for between the spacer means and graphite body that possible relative changes in dimensions of the fuel body and the graphite body are provided for.

6. A fuel element according to claim 5 wherein said spacer means is a part of said fuel body.

7. A fuel element according to claim 5 wherein said spacer means is a part of said graphite body.

8. A fuel element according to claim 5 wherein said spacer means is constructed and machined separately but is fixed to said fuel body.

9. A fuel element according to claim 5 wherein one of said fuel body and said graphite body is provided with at least three spacer means, the counterpart of said fuel body and said graphite body is provided with slot means corresponding to at least one of said spacer means and one of said spacer means is interlocked with said slot means to prevent twisting of the fuel body.

10. A fuel element according to claim 9 wherein three of said spacer means are interlocked with corresponding three slot means.

11. A fuel element according to claim 5 including a plurality of said fuel bodies arranged in axial alignment, each body having an axial bore, said bodies being fixed in position by a graphite pin extending through said bores, said spacer provided with means being positioned between said fuel bodies, said spacer means being provided with extensions in the form of a star extending into the space between the fuel bodies and the graphite body.

12. A fuel element according to claim 5 wherein a plurality of said individual fuel bodies are stacked to form a column within said graphite body with said spacer means being disposed between the ends of adjacent fuel bodies, each of said spacer means engaging said ends and having flange portions extending radially of said ends.

References Cited

UNITED STATES PATENTS

| | | | |
|---|---|---|---|
| 3,022,240 | 2/1962 | Bassett | 176—68 |
| 3,274,068 | 9/1966 | Koutzetol | 176—69 |
| 3,278,389 | 10/1966 | Delepeyroux et al. | 176—81 |
| 3,291,699 | 12/1966 | Trickett et al. | 176—69 X |
| 3,386,887 | 6/1968 | Mogard | 176—68 X |
| 3,421,979 | 1/1969 | Linning | 176—68 |
| 3,407,116 | 10/1968 | Clough | 176—68 |
| 3,133,000 | 5/1964 | Beavis | 176—71 X |
| 3,259,548 | 7/1966 | Thorn et al. | 176—84 |
| 3,085,958 | 4/1963 | Knights et al. | 176—84 |
| 3,219,540 | 11/1965 | Costes | 176—84 X |
| 3,261,759 | 7/1966 | Boudouresques et al. | 176—83 X |

FOREIGN PATENTS

| | | | |
|---|---|---|---|
| 1,463,313 | 7/1966 | France | 176—84 |

CARL D. QUARFORTH, Primary Examiner

G. G. SOLYST, Assistant Examiner

U.S. Cl. X.R.

176—81, 84

UNITED STATES PATENT OFFICE
CERTIFICATE OF CORRECTION

Patent No. 3,738,912　　　　　　　Dated June 12, 1973

Inventor(s) Lothar Rachor and Karl-Gerhard Hackstein

It is certified that error appears in the above-identified patent and that said Letters Patent are hereby corrected as shown below:

In the heading; please add:

--Claims priority, German Application No.

P 19 30 182.7, filed June 13, 1969--.

Column 1, line 25 change "graphic" to --graphite--.

Column 1, line 48 change "graphite" to --graphitic--.

Signed and sealed this 5th day of March 1974.

(SEAL)
Attest:

EDWARD M. FLETCHER, JR.　　　　　C. MARSHALL DANN
Attesting Officer　　　　　　　　Commissioner of Patents